US010214955B2

(12) United States Patent
Abe et al.

(10) Patent No.: US 10,214,955 B2
(45) Date of Patent: Feb. 26, 2019

(54) GLASS PANEL UNIT, GLASS WINDOW, AND METHOD FOR MANUFACTURING GLASS PANEL UNIT

(71) Applicant: Panasonic Intellectual Property Management Co., Ltd., Osaka (JP)

(72) Inventors: Hiroyuki Abe, Osaka (JP); Eiichi Uriu, Osaka (JP); Masataka Nonaka, Osaka (JP); Tasuku Ishibashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/558,471

(22) PCT Filed: Mar. 8, 2016

(86) PCT No.: PCT/JP2016/001249
§ 371 (c)(1),
(2) Date: Sep. 14, 2017

(87) PCT Pub. No.: WO2016/152052
PCT Pub. Date: Sep. 29, 2016

(65) Prior Publication Data
US 2018/0051506 A1    Feb. 22, 2018

(30) Foreign Application Priority Data
Mar. 20, 2015    (JP) .................................. 2015-058598

(51) Int. Cl.
*E06B 3/66* (2006.01)
*C03C 27/06* (2006.01)
(Continued)

(52) U.S. Cl.
CPC ............ *E06B 3/6612* (2013.01); *C03C 17/09* (2013.01); *C03C 27/06* (2013.01);
(Continued)

(58) Field of Classification Search
CPC .. E06B 3/6612; E06B 3/66304; E06B 3/6715; E06B 3/6775; F24S 80/54; C03C 17/09; C03C 27/06
See application file for complete search history.

(56) References Cited

U.S. PATENT DOCUMENTS 621,542 A * 3/1899 Sheppard .................. E06B 7/14
                                                                      52/204.593
4,027,443 A * 6/1977 Briggs ...................... E06B 5/10
                                                                      156/109
(Continued)

FOREIGN PATENT DOCUMENTS

FR       2367180 A1 * 5/1978 ............... A62C 2/06
JP       S63-501728 A    7/1988
(Continued)

OTHER PUBLICATIONS

Written Opinion and International Search Report for International Application No. PCT/JP2016/001249, dated May 17, 2016.

*Primary Examiner* — Adriana Figueroa
(74) *Attorney, Agent, or Firm* — Renner Otto Boisselle & Sklar, LLP

(57) ABSTRACT

The glass panel unit includes a first glass substrate, a second glass substrate, a sealing member, an inside space, and a plurality of spacers. The inside space is hermetically enclosed by the first glass substrate, the second glass substrate, and the sealing member, and has reduced pressure. The plurality of spacers are placed in the inside space. At least one of the first glass substrate and the second glass substrate is a wire-embedded glass panel with a wire structure embedded therein. The plurality of spacers are arranged so as to overlap with part of the wire structure in a plan view.

5 Claims, 11 Drawing Sheets

(51) Int. Cl.
*C03C 17/09* (2006.01)
*E06B 3/663* (2006.01)
*E06B 3/67* (2006.01)
*E06B 3/677* (2006.01)
*F24S 80/54* (2018.01)

(52) U.S. Cl.
CPC ........ *E06B 3/66304* (2013.01); *E06B 3/6715* (2013.01); *E06B 3/6775* (2013.01); *F24S 80/54* (2018.05)

(56) References Cited

U.S. PATENT DOCUMENTS

| | | | |
|---|---|---|---|
| 5,005,557 A | 4/1991 | Bachli | |
| 5,009,218 A | 4/1991 | Bachli | |
| 6,105,336 A * | 8/2000 | Katoh | E06B 3/66 428/34 |
| 6,210,763 B1 * | 4/2001 | Katoh | E06B 3/66304 428/34 |
| 6,309,733 B1 | 10/2001 | Minaai et al. | |
| 6,387,460 B1 * | 5/2002 | Shukuri | E06B 3/6612 428/34 |
| 6,955,026 B2 * | 10/2005 | Misonou | E06B 3/66 428/34 |
| 7,090,906 B2 * | 8/2006 | O'Keeffe | B32B 17/02 428/201 |
| 9,010,149 B2 * | 4/2015 | Jeon | C03B 23/245 501/14 |

FOREIGN PATENT DOCUMENTS

| | | | |
|---|---|---|---|
| JP | H06-17579 A | | 1/1994 |
| JP | 10-87350 A | | 4/1998 |
| JP | 2000-086307 A | | 3/2000 |
| JP | 2000-44292 | * | 5/2000 |
| JP | 2002-37646 A | | 2/2002 |
| JP | 2004-323317 A | | 11/2004 |
| JP | 2011006874 A | * | 1/2011 |
| WO | WO 99/59931 | | 11/1999 |

* cited by examiner

GLASS PANEL UNIT, GLASS WINDOW, AND METHOD FOR MANUFACTURING GLASS PANEL UNIT

TECHNICAL FIELD

The present invention relates to glass panel units, glass windows, and methods for manufacturing glass panel unit.

BACKGROUND ART

Patent Literature 1 discloses a vacuum insulated glass plate (glass panel unit). In this vacuum insulated glass plate, an evacuated space (vacuum space) is formed between a first plate of glass and a second plate of glass, and multiple spacers are positioned inside the evacuated space.

Additionally, Patent Literature 1 discloses that wire-reinforced glass which is excellent in fireproof properties can be used as the first plate of glass and/or the second plate of glass.

CITATION LIST

Patent Literature

Patent Literature 1: JP H6-17579 A

SUMMARY OF INVENTION

The aforementioned conventional glass panel unit includes the evacuated space and thus has improved thermally insulating properties, and may have improved fireproof properties when the wire-reinforced glass is used. However, use of the wire-reinforced glass may allow users to perceive the multiple spacers and wire simultaneously. In such a case, irregular pattern formed by the multiple spacers and the wire can be seen, and this may lead to deterioration of appearance.

An object to be solved by the present invention would be to propose a glass panel unit with improved thermally insulating and fireproof properties as well as improved appearance, and a method for manufacturing the same.

A glass panel unit according to one aspect of the present invention includes a first glass substrate, a second glass substrate, a sealing member, an inside space, and a plurality of spacers.

The second glass substrate is placed facing the first glass substrate.

The sealing member hermetically bonds outer peripheries of the first glass substrate and the second glass substrate to each other.

The inside space is hermetically enclosed by the first glass substrate, the second glass substrate, and the sealing member, and has reduced pressure.

The plurality of spacers are placed in the inside space.

At least one of the first glass substrate and the second glass substrate is a wire-embedded glass panel with a wire structure embedded therein. The plurality of spacers are arranged so as to overlap with part of the wire structure in a plan view.

A glass window according to another aspect of the present invention includes the above glass panel unit and a window frame into which an outer periphery of the glass panel unit is fitted.

A method for manufacturing glass panel unit, according to another aspect of the present invention, includes a placing step, a bonding step, and a pressure reducing step.

The placing step is a step of placing a first glass substrate and a second glass substrate to face each other with a plurality of spacers in-between.

The bonding step is a step of hermetically bonding outer peripheries of the first glass substrate and the second glass substrate to each other to form an inside space between the first glass substrate and the second glass substrate.

The pressure reducing step is a step of reducing pressure of the inside space.

At least one of the first glass substrate and the second glass substrate is a wire-embedded glass panel with a wire structure embedded therein.

The placing step includes arranging the plurality of spacers so as to overlap with part of the wire structure in a plan view.

A method for manufacturing glass panel unit, according to another aspect of the present invention, includes a placing step, a bonding step, a pressure reducing step, and a mounting step.

The placing step is a step of placing a pair of glass panels to face each other with a plurality of spacers in-between.

The bonding step is a step of hermetically bonding outer peripheries of the pair of glass panels to each other to form an inside space between the pair of glass panels.

The pressure reducing step is a step of reducing pressure of the inside space.

The mounting step is a step of mounting a glass panel with a wire structure embedded therein on at least one of the pair of glass panels so that the plurality of spacers overlap with part of the wire structure in a plan view.

DESCRIPTION OF EMBODIMENTS

Embodiment 1

Hereinafter, a glass panel unit of Embodiment 1 and a method for manufacturing the same are described.

Figure 1A:
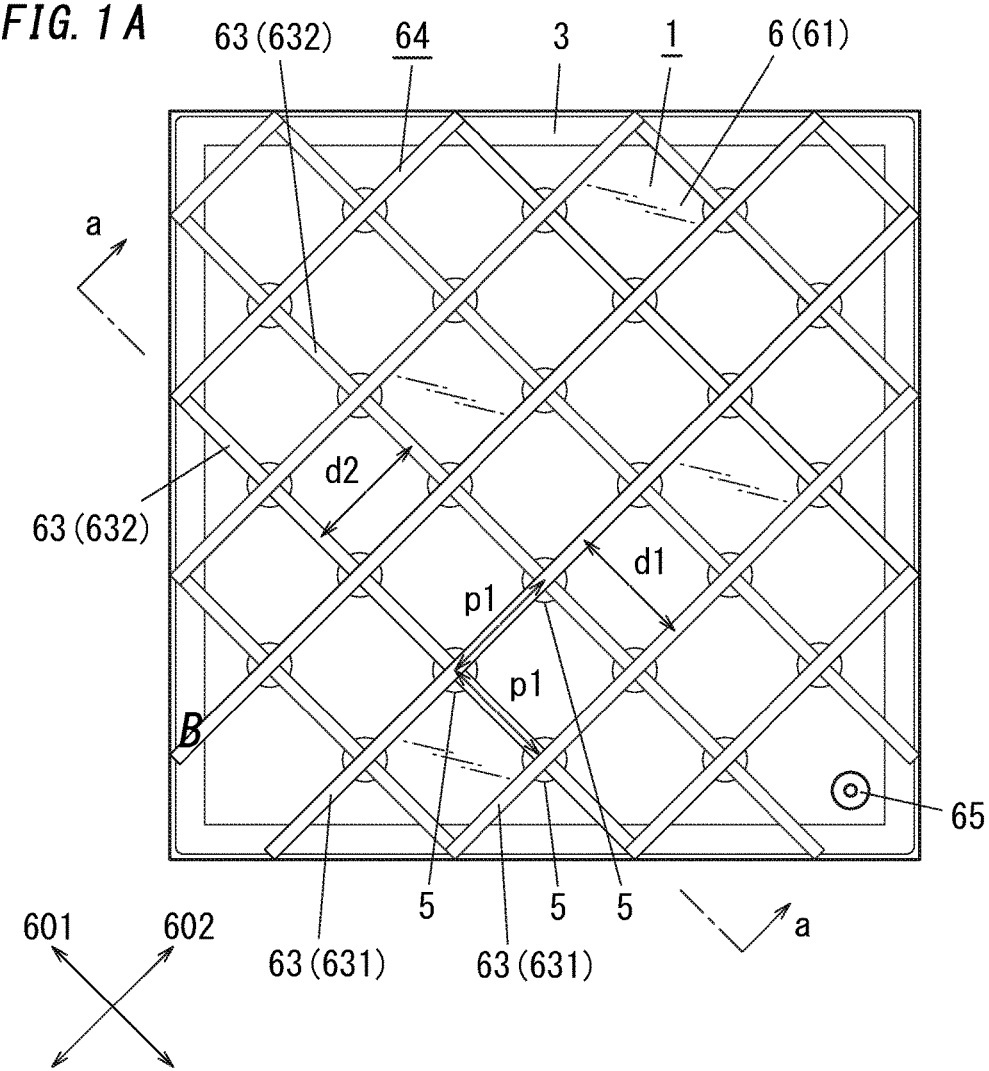
FIG. 1A is a schematic plan of a glass panel unit of Embodiment 1 and FIG. 1B is a section along line "a-a" in FIG. 1A.
Figure 1B:
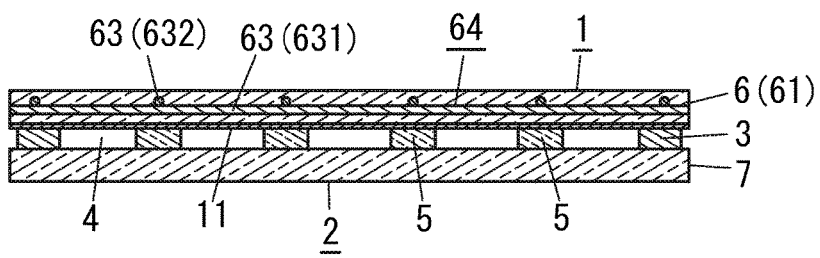

FIG. 1A and FIG. 1B show the glass panel unit of Embodiment 1 schematically. FIG. 1B is a section along line "a-a" in FIG. 1A.

The glass panel unit of Embodiment 1 includes a first glass substrate 1, a second glass substrate 2, a sealing member 3, an inside space 4, and a plurality of spacers 5.

The first glass substrate 1 and the second glass substrate 2 are placed facing (opposite) each other. The first glass substrate 1 and the second glass substrate 2 are placed parallel to each other with a slight distance therebetween.

Outer shapes of the first glass substrate 1 and the second glass substrate 2 are identical to each other in a plan view (that is, when viewed in a direction where the first glass substrate 1 and the second glass substrate 2 are opposite each other).

The sealing member 3 has an outer shape of a rectangular frame, and is placed between the first glass substrate 1 and the second glass substrate 2. An outer periphery of the first glass substrate 1 and an outer periphery of the second glass substrate 2 are hermetically bonded to each other through the sealing member 3.

The inside space 4 is a hermetically enclosed space surrounded by the first glass substrate 1, the second glass substrate 2, and the sealing member 3. Pressure of the inside space 4 is reduced until it reaches a predetermined degree of vacuum (for example, 0.1 Pa or lower).

The plurality of spacers 5 are placed in the inside space 4. The plurality of spacers 5 are sandwiched between the first glass substrate 1 and the second glass substrate 2, and surrounded by the sealing member 3.

Each spacer 5 is in contact with the first glass substrate 1 and the second glass substrate 2 to keep a distance between the first glass substrate 1 and the second glass substrate 2. Each spacer 5 may be preferably transparent.

In the glass panel unit of Embodiment 1, the first glass substrate 1 is a wire-embedded glass panel 6. The wire-embedded glass panel 6 includes a glass panel 61 with a wire structure 64 embedded therein. The wire-embedded glass panel 6 has one surface provided with an infrared low reflective film 11.

The second glass substrate 2 is a glass panel 7 with no wire structure embedded therein.

The wire structure 64 embedded in the first glass substrate 1 is constituted by a plurality of wires 63. The plurality of wires 63 include: a plurality of first wires 631 which are arranged in a first direction 601 at an interval of a predetermined distance d1 and are parallel to each other; and a plurality of second wires 632 which are arranged in a second direction 602 at an interval of a predetermined distance d2 and are parallel to each other.

In Embodiment 1, the distance d1 is equal to the distance d2, and an angle between the first direction 601 and the second direction 602 is 90 degrees.

Each of the plurality of first wires 631 crosses one or more or all of the plurality of second wires 632 at a right angle in a plan view. Each of the plurality of second wires 632 crosses one or more or all of the plurality of first wires 631 at a right angle in a plan view.

In summary, in the wire structure 64 of Embodiment 1, the plurality of first wires 631 parallel to each other cross the plurality of second wires 632 parallel to each other to form a mesh (lattice) in a plan view. There is a part at which a first wire 631 and a second wire 632 cross each other (hereinafter, the part is referred to as an "intersection"). A plurality of the parts are positioned at lattice points at regular intervals in the first direction 601 and the second direction 602 in a plan view.

The plurality of spacers 5 are positioned inside the inside space 4 so that each spacer 5 overlaps with a corresponding one of the intersections of the wire structure 64 in a plan view.

Consequently, in the glass panel unit of Embodiment 1, even if the plurality of spacers 5 and the wire structure 64 are seen simultaneously, each spacer 5 can be visually perceived in a state where it overlaps with a corresponding intersection of the wire structure 64. Therefore, it is possible to suppress deterioration of appearance.

Additionally, a total pattern of a combination of the plurality of spacers 5 and the wire structure 64 is repeated regularly in all directions in a plan view, and thus appearance thereof may give a good impression to users.

Hereinafter, a modification of the glass panel unit of Embodiment 1 is further described.

In Embodiment 1, an arrangement pattern of the plurality of spacers 5 corresponds to a pattern shown in FIG. 1A. However, the arrangement pattern of the plurality of spacers 5 is not limited to this, but may be an arrangement pattern shown in FIG. 4, for example.

In the arrangement pattern of Embodiment 1 shown in FIG. 1A and FIG. 1B, a pitch p1 determining intervals between lattice points where the plurality of spacers 5 are arranged is equal to a distance (=the distance d1=the distance d2) between adjacent wires 63.

Figure 4:
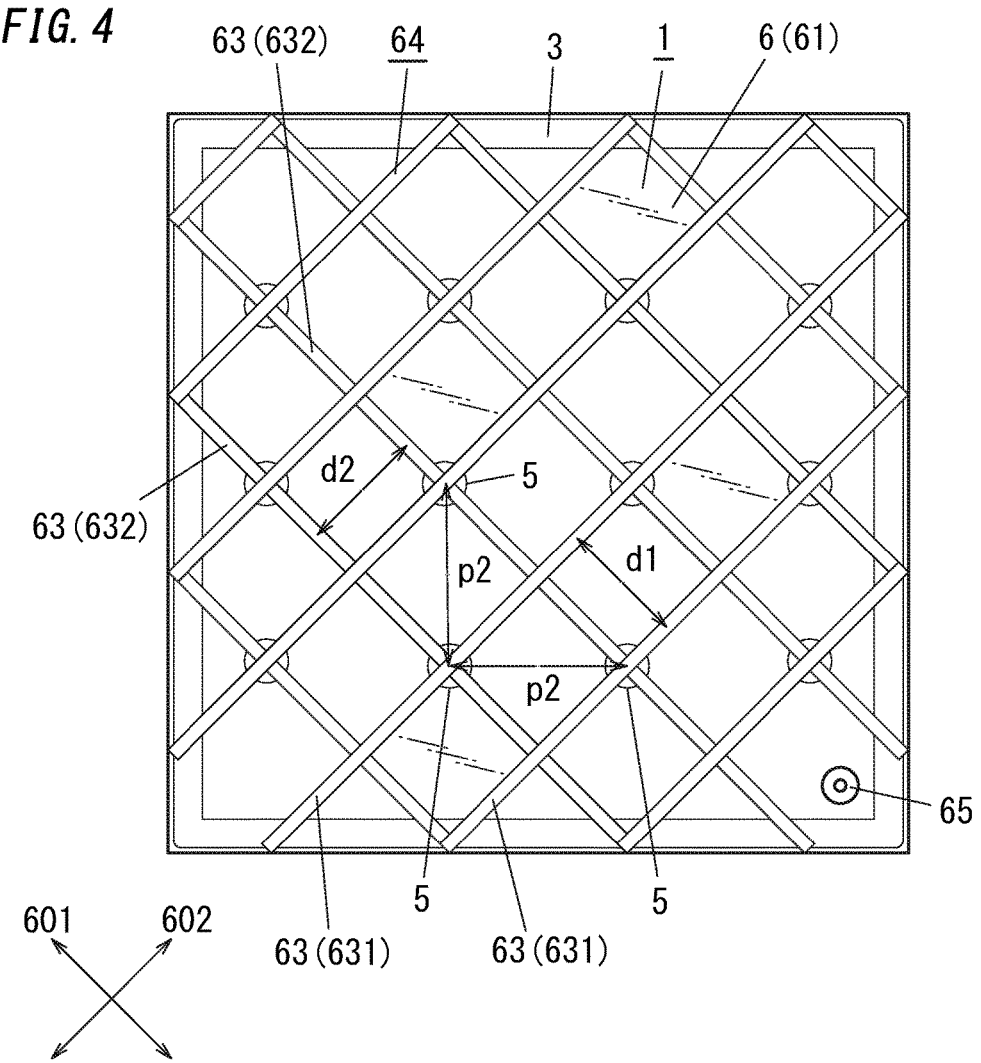
FIG. 4 is a schematic plan of a modification of the glass panel unit of Embodiment 1.

In contrast, in the arrangement pattern of the modification shown in FIG. 4, a pitch p2 determining intervals between lattice points where the plurality of spacers 5 are arranged is equal to a distance (=the distance d1=the distance d2) between adjacent wires 63 multiplied by $2^{1/2}$.

As to Embodiment 1, each spacer 5 has a center which coincides with a center of a corresponding intersection of the wire structure 64 in a plan view. However, at least one spacer 5 may have a center which does not coincide with a center of a corresponding one of the intersections of the wire structure 64 in a plan view.

As to Embodiment 1, each spacer 5 overlaps with only a corresponding one of the intersections of the wire structure 64. However, at least one spacer 5 may overlap with part of the wire structure 64 except for the intersections.

As to Embodiment 1, the spacers 5 placed in the inside space 4 each overlap with any of the intersections of the wire structure 64. However, it is allowed to place one or more additional spacers not overlapping with the wire structure 64.

As to Embodiment 1, the wire structure 64 is in a mesh form, but may be in a form (for example, a form of wires parallel arranged in one direction only) other than a mesh form.

Hereinafter, a manufacturing method of the glass panel unit of Embodiment 1 is described.

Figure 3:
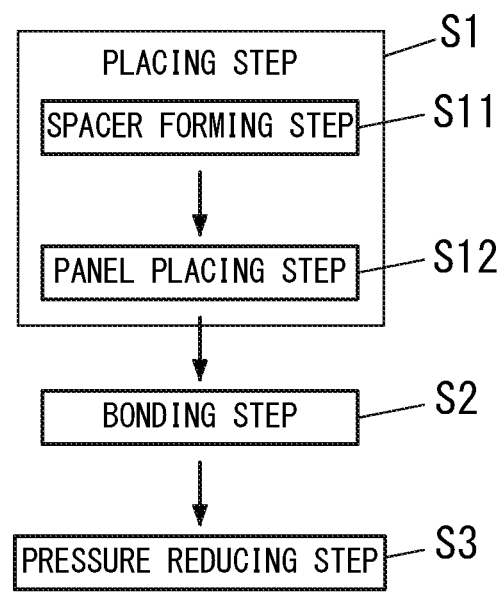
FIG. 3 is a flow chart for illustration of individual steps included in the manufacturing method for the glass panel unit of Embodiment 1.

The manufacturing method of the glass panel unit of Embodiment 1 includes, as shown in FIG. 3, a placing step S1, a bonding step S2, and a pressure reducing step S3.

The placing step S1 is a step of placing the first glass substrate 1 and the second glass substrate 2 to face each other with the plurality of spacers 5 in-between. The placing step S1 of Embodiment 1 includes a spacer forming step S11 and a panel placing step S12.

Hereinafter, individual steps are described in sequence.

<Spacer Forming Step>

Figure 2A:
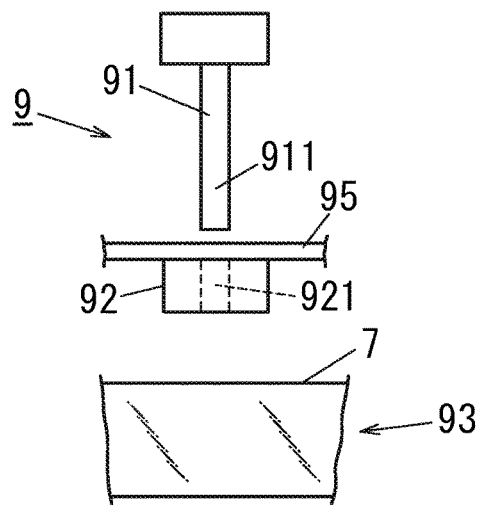
FIG. 2A is a schematic side view of a device used for a manufacturing method for the glass panel unit of Embodiment 1.
Figure 2B:
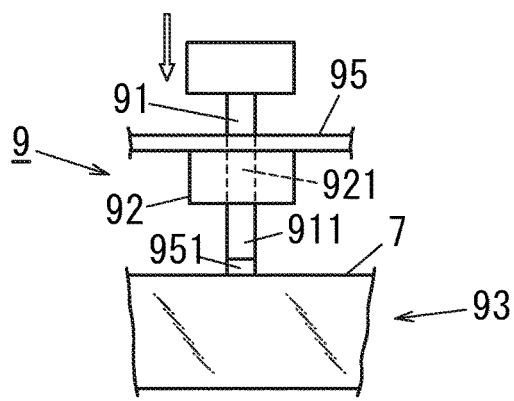
FIG. 2B is a schematic side view for illustration of punching by the device used for the manufacturing method for the glass panel unit of Embodiment 1.
Figure 2C:
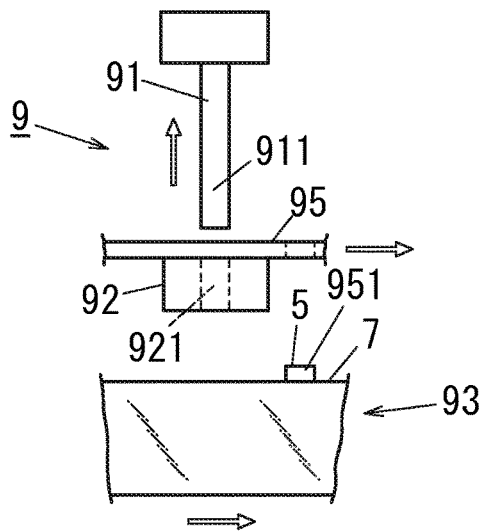
FIG. 2C is a schematic side view for illustration of transferring a sealing member by the device used for the manufacturing method for the glass panel unit of Embodiment 1.

As shown in FIG. 2A to FIG. 2C, the spacer forming step S11 is a step of punching a seat member 95 by a punch 91 to remove part 951 from the seat member 95 and place the part 951 removed, on a main face of the glass panel 7 (the second glass substrate 2) by the punch 91 so as to serve as a spacer 5. The seat member 95 may be preferably transparent.

A device 9 shown in FIG. 2A to FIG. 2C includes the punch 91, a die 92, and a panel support 93 which are arranged in this order from an upper side to a lower side.

The panel support 93 supports the glass panel 7 in a posture where the main face points upward.

The die 92 is positioned above the panel support 93. The die 92 is positioned above the main face of the glass panel 7 supported on the panel support 93.

The die 92 includes a penetrating hole 921. The seat member 95 is placed on an upper face of the die 92 to cover the penetrating hole 921. The seat member 95 is made of resin but may be made of another material such as metal.

The punch 91 is placed above the die 92. The punch 91 includes a protrusion 911 with a pillar shape protruding downward. The protrusion 911 serves as part for punching the seat member 95 placed on the die 92 by moving downward through the penetrating hole 921.

The spacer forming step S11 includes moving the punch 91 downward in a straight track. By moving the punch 91 downward, the protrusion 911 with a pillar shape punches the seat member 95 to remove the part 951 therefrom and carries it downward through the penetrating hole 921 of the die 92 (see an outline arrow in FIG. 2B).

The part 951 separate from the seat member 95 by punching is pressed against the main face of the glass panel 7 while being in contact with a top end surface of the protrusion 911.

The part 951 separate from the seat member 95 is pressed against the main face of the glass panel 7 by the top end surface of the protrusion 911 at a predetermined pressure for a predetermined period of time, and thereby tentatively fixed on the main face of the glass panel 7. The part 951 which is removed from the seat member 95 and tentatively fixed serves as the spacer 5 with a pillar shape.

In the device 9 of Embodiment 1, the punch 91 includes one protrusion 911 and the die 92 includes one penetrating hole 921. Alternatively, it may be allowed that the punch 91 includes a plurality of protrusions 911 and the die 92 includes a plurality of penetrating holes 921. In this case, one-time punching allows formation of a plurality of spacers 5 on the glass panel 7.

As described above, forming the spacer 5 on the glass panel 7 is repeated with moving the glass panel 7 and the seat member 95 horizontally (see outline arrows in FIG. 2C) being performed before next forming. Thereby, it is possible to produce the glass panel 7 including the plurality of spacers 5 arranged at a predetermined pitch.

<Panel Placing Step>

The panel placing step S12 includes placing the sealing member 3 on an outer periphery of the main face of the glass panel 7 on which the plurality of spacers 5 are placed, and placing the wire-embedded glass panel 6 (the glass panel 61 with the wire structure 64 embedded therein) on the glass panel 7 from the above.

The wire-embedded glass panel 6 is placed and positioned so that each of the plurality of spacers 5 overlaps with a corresponding one of the intersections of the wire structure 64.

<Bonding Step>

The bonding step S2 is a step of melting the sealing member 3 by heat to be bonded to the wire-embedded glass panel 6 and the glass panel 7.

The outer peripheries of the wire-embedded glass panel 6 and the glass panel 7 are hermetically bonded to each other with the sealing member 3. Thereby, the inside space 4 enclosed by the sealing member 3 is formed between the wire-embedded glass panel 6 and the glass panel 7. Inside the inside space 4, the plurality of spacers 5 are present.

<Pressure Reducing Step>

The pressure reducing step S3 includes reducing pressure of the inside space 4 by use of a glass pipe 65 for evacuation provided to the wire-embedded glass panel 6. After reduction of pressure, the glass pipe 65 is hermetically closed. The glass panel 7 may be provided with the glass pipe 65 in some cases.

By finishing the aforementioned individual steps, the glass panel unit of Embodiment 1 shown in FIG. 1A and FIG. 1B can be manufactured.

Hereinafter, a modification of the manufacturing method of the glass panel unit of Embodiment 1 is further described.

As to the spacer forming step S11 of Embodiment 1, the plurality of spacers 5 are formed on the glass panel 7. In an alternative case, the plurality of spacers 5 may be formed on the wire-embedded glass panel 6.

In this case, the spacer forming step S11 includes forming the plurality of spacers 5 at positions each overlapping with a corresponding one of the intersections of the wire structure 64 in a plan view. The panel placing step S12 further includes placing the glass panel 7 on the wire-embedded glass panel 6 on which the plurality of spacers 5 are formed.

In an alternative case, the glass panel unit of Embodiment 1 may be manufactured without performing the spacer forming step S11 (that is, the plurality of spacers 5 are not formed on the glass panel 7 and/or the wire-embedded glass panel 6 by punching). In this case, plenty of spacers 5 with predetermined dimensions and shape may be manufactured in advance and stored. In the placing step S1, a necessary number of spacers 5 are taken out from the plenty of stored spacers 5 and are placed on the main face of the glass panel 7.

Embodiment 2

Figure 5A:
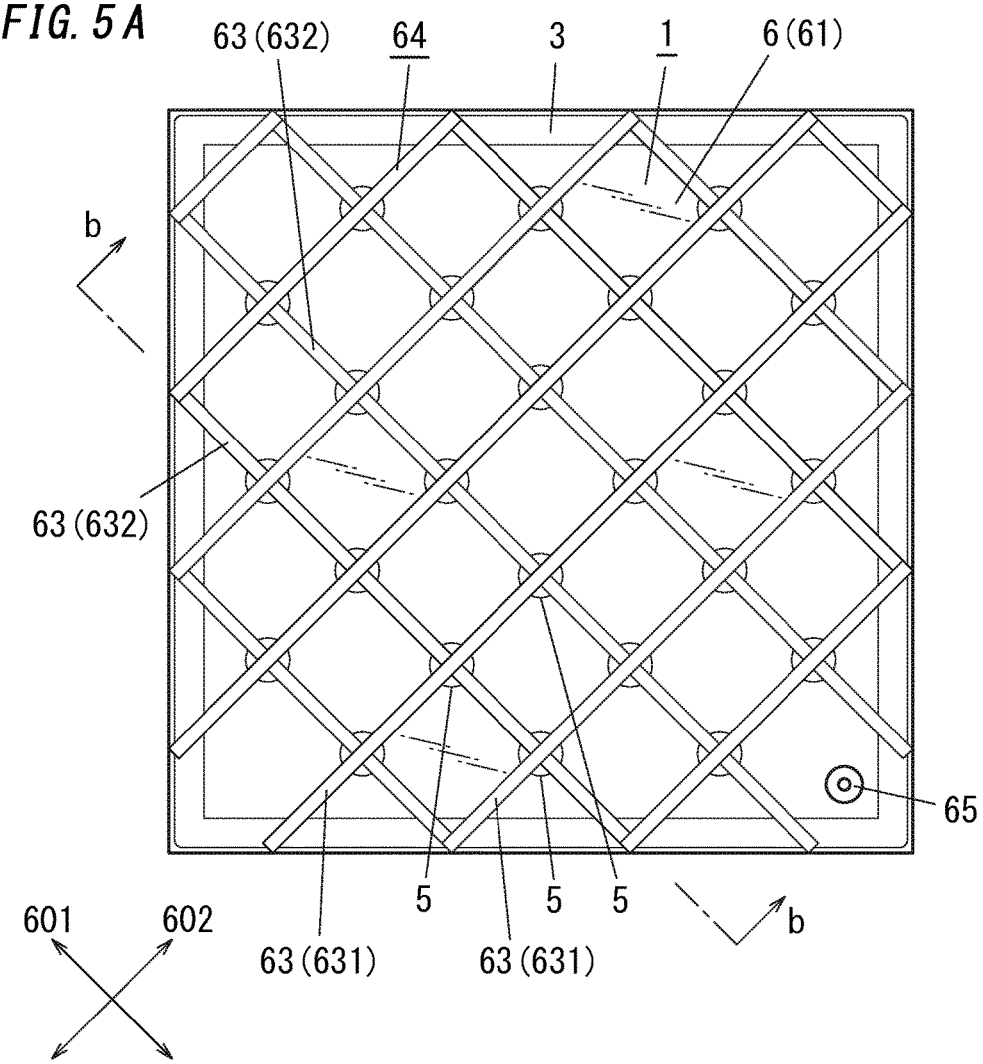
FIG. 5A is a schematic plan of a glass panel unit of Embodiment 2 and FIG. 5B is a section along line "b-b" in FIG. 5A.

A glass panel unit of Embodiment 2 and a method for manufacturing the same are described with reference to FIG. 5A and FIG. 5B. Note that, same components as Embodiment 1 are designated by common reference signs to avoid detailed descriptions, and different components from Embodiment 1 are described in detail.

The glass panel unit of Embodiment 2 is different from Embodiment 1 in that both a first glass substrate 1 and a second glass substrate 2 are wire-embedded glass panels 6.

Figure 5B:
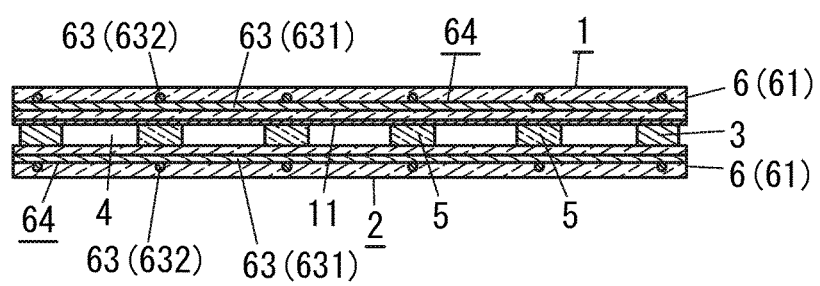

As shown in FIG. 5B, in the glass panel unit of Embodiment 2, the second glass substrate 2 is a wire-embedded glass panel 6 (a glass panel 61 with a wire structure 64 embedded therein) as with the first glass substrate 1.

A plurality of spacers 5 are positioned in the inside space 4 to overlap with intersections of the wire structure 64 embedded in the first glass substrate 1 and additionally overlap with intersections of the wire structure 64 embedded in the second glass substrate 2 in a plan view.

Consequently, also in the glass panel unit of Embodiment 2, each spacer 5 can be visually perceived in a state where it overlaps with a corresponding intersection of the wire structures 64. Additionally, a total pattern of a combination of the plurality of spacers 5 and the wire structures 64 is repeated regularly, and thus appearance thereof may give a good impression to users.

A manufacturing method of the glass panel unit of Embodiment 2 includes a placing step S1 (a spacer forming step S11 and a panel placing step S12), a bonding step S2, and a pressure reducing step S3 as with Embodiment 1.

Note that, in the spacer forming step S11 of Embodiment 2, the plurality of spacers 5 are formed on the wire-embedded glass panel 6 constituting the second glass substrate 2 according to a predetermined arrangement pattern. The plurality of spacers 5 are individually formed at positions overlapping with the intersections of the wire structure 64 embedded in the wire-embedded glass panel 6 by punching.

Thereafter, in the panel placing step S12, a sealing member 3 is placed on the wire-embedded glass panel 6 on which the plurality of spacers 5 are formed. And, placed on the wire-embedded glass panel 6 is another wire-embedded glass panel 6 constituting the first glass substrate 1. The wire-embedded glass panel 6 constituting the first glass substrate 1 is placed and positioned so that the plurality of spacers 5 overlap with the intersections of the wire structure 64 individually.

Embodiment 3

A glass panel unit of Embodiment 3 and a method for manufacturing the same are described with reference to FIG. 6A, FIG. 6B and FIG. 7. Note that, same components as Embodiment 1 are designated by common reference signs to avoid detailed descriptions, and different components from Embodiment 1 are described in detail.

The glass panel unit of Embodiment 3 is different from Embodiment 1 in that a wire-embedded glass panel 6 constituting a first glass substrate 1 has a structure where a glass panel 61 with a wire structure 64 embedded therein and an additional glass panel 7 different therefrom are stacked.

Figure 6A:
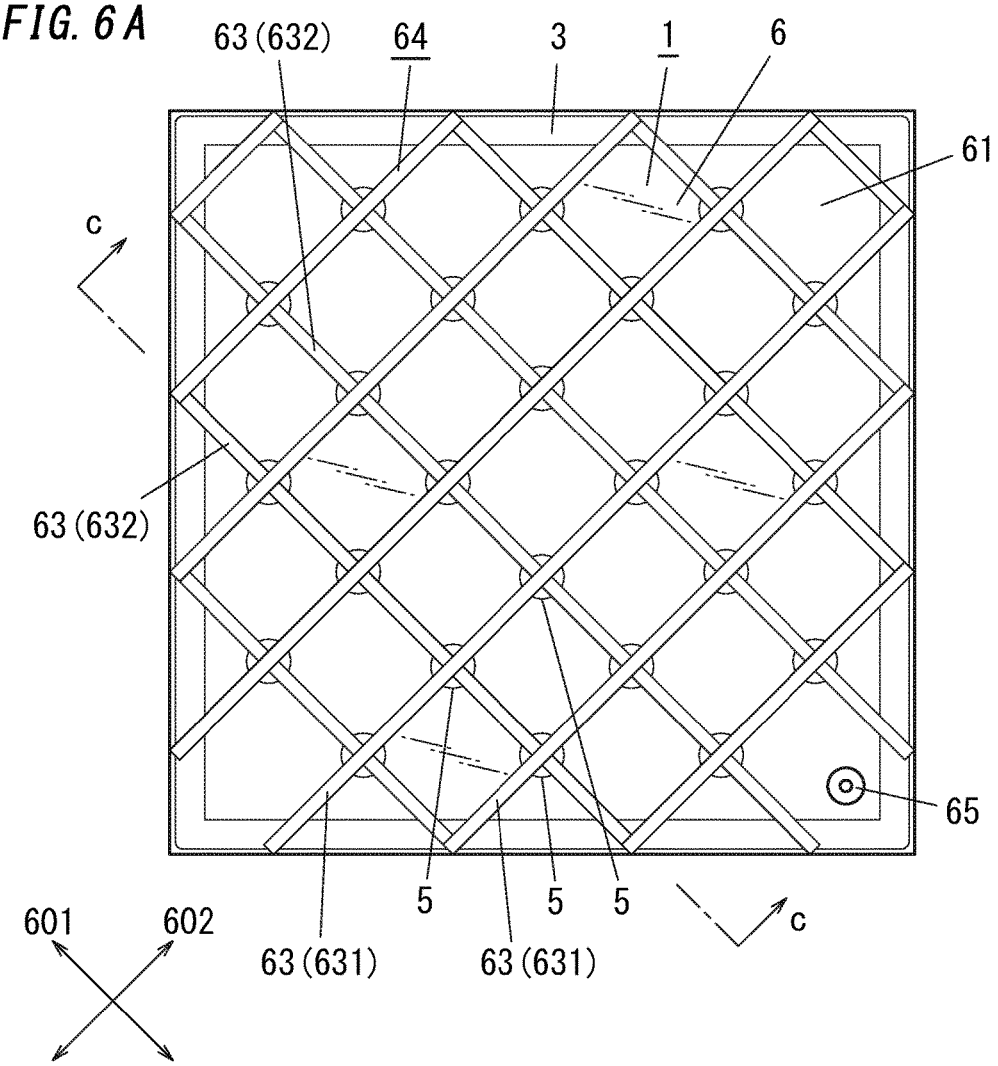
FIG. 6A is a schematic plan of a glass panel unit of Embodiment 3 and FIG. 6B is a section along line "c-c" in FIG. 6A.
Figure 6B:
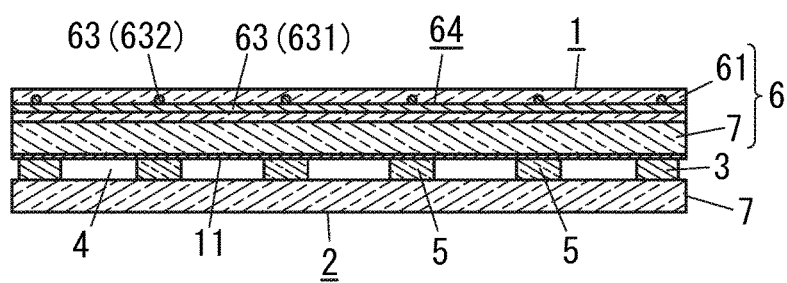

As shown in FIG. 6B, in the glass panel unit of Embodiment 3, an inside space 4 is formed between a pair of glass panels 7 opposite each other.

One glass panel 7 of the pair of glass panels 7 serves as a second glass substrate 2. The other glass panel 7 and the glass panel 61 mounted thereon constitute a wire-embedded glass panel 6. This wire-embedded glass panel 6 serves as the first glass substrate 1.

The glass panel 61 forming one part of the first glass substrate 1 is a glass panel incorporating a wire structure 64 (that is, the wire structure 64 including a plurality of wires 63 crossing to form a mesh) similar to that of Embodiment 1. In contrast, the glass panel 7 forming another part of the first glass substrate 1 is a glass panel with no wire structure embedded therein.

As to the first glass substrate 1, the glass panel 61 is positioned on a further side from the inside space 4 and the glass panel 7 is positioned on a closer side to the inside space 4. The glass panel 7 has one surface provided with an infrared low reflective film 11.

The plurality of spacers 5 are positioned in the inside space 4 to overlap with intersections of the wire structure 64 embedded in the glass panel 61 in a plan view.

Accordingly, also in the glass panel unit of Embodiment 3, each spacer 5 can be visually perceived in a state where it overlaps with a corresponding intersection of the wire structure 64. Additionally, a total pattern of a combination of the plurality of spacers 5 and the wire structure 64 is repeated regularly, and thus appearance thereof may give a good impression to users.

Hereinafter, a manufacturing method of the glass panel unit of Embodiment 3 is described.

Figure 7:
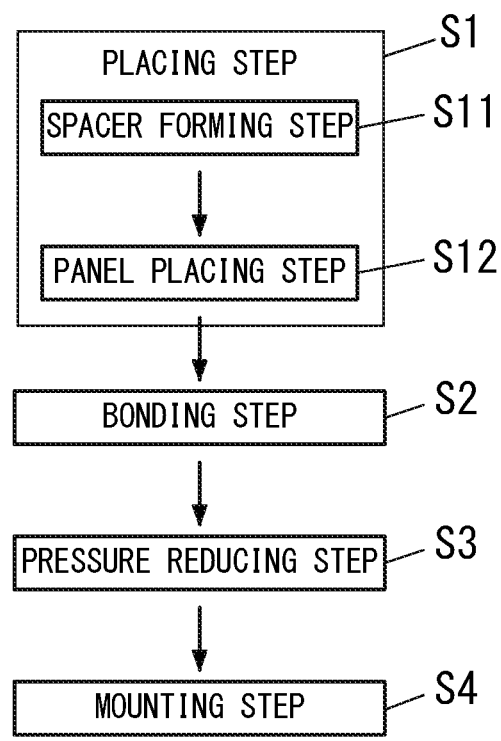
FIG. 7 is a flow chart for illustration of individual steps included in a manufacturing method for the glass panel unit of Embodiment 3.

The manufacturing method of the glass panel unit of Embodiment 3 includes, as shown in FIG. 7, a placing step S1 (a spacer forming step S11 and a panel placing step S12), a bonding step S2, a pressure reducing step S3, and a mounting step S4.

Hereinafter, individual steps are described in sequence.

<spacer forming step>

The spacer forming step S11 includes arranging the plurality of spacers 5 at lattice points at a predetermined pitch within the main face of the glass panel 7 constituting the second glass substrate 2, as with Embodiment 1.

<Panel Placing Step>

The panel placing step S12 includes placing the sealing member 3 above the main face of the glass panel 7 on which the plurality of spacers 5 are formed, and placing the additional glass panel 7 on this glass panel 7.

<Bonding Step>

The bonding step S2 is a step of melting the sealing member 3 by heat to be bonded to the pair of glass panels 7, thereby hermetically bonding outer peripheries of the pair of glass panels 7 to each other through the sealing member 3. Thereby, the inside space 4 in which the plurality of spacers 5 are positioned is formed between the pair of glass panels 7.

<Pressure Reducing Step>

The pressure reducing step S3 includes reducing pressure of the inside space 4 in a similar manner to Embodiment 1.

<Mounting Step>

The mounting step S4 includes mounting the glass panel 61 with the wire structure 64 embedded therein on one of the pair of glass panels 7.

The glass panel 61 is placed and positioned so that the plurality of spacers 5 overlap with the intersections of the wire structure 64 individually.

The glass panel 61 mounted as described above is fixed to the glass panel 7, and thereby the wire-embedded glass panel 6 of Embodiment 3 is formed. This wire-embedded glass panel 6 constitutes the first glass substrate 1.

By finishing the above individual steps, the glass panel unit of Embodiment 3 shown in FIG. 6A and FIG. 6B is manufactured.

In the spacer forming step S11 of Embodiment 3, the plurality of spacers 5 are formed on the glass panel 7 constituting the second glass substrate 2. However, the plurality of spacers 5 may be formed on the glass panel 7 constituting the first glass substrate 1.

Embodiment 4

A glass panel unit of Embodiment 4 and a method for manufacturing the same are described with reference to FIG. 8A and FIG. 8B. Note that, same components as Embodiment 3 are designated by common reference signs to avoid detailed descriptions, and different components from Embodiment 3 are described in detail.

The glass panel unit of Embodiment 4 is different from Embodiment 3 in that a second glass substrate 2 is a wire-embedded glass panel 6 as with a first glass substrate 1.

In more detail, in the glass panel unit of Embodiment 4, each of the first glass substrate 1 and the second glass substrate 2 is a wire-embedded glass panel 6 having a structure where a glass panel 61 with a wire structure 64 embedded therein and a glass panel 7 with no wire structure embedded therein are stacked.

Figure 8A:
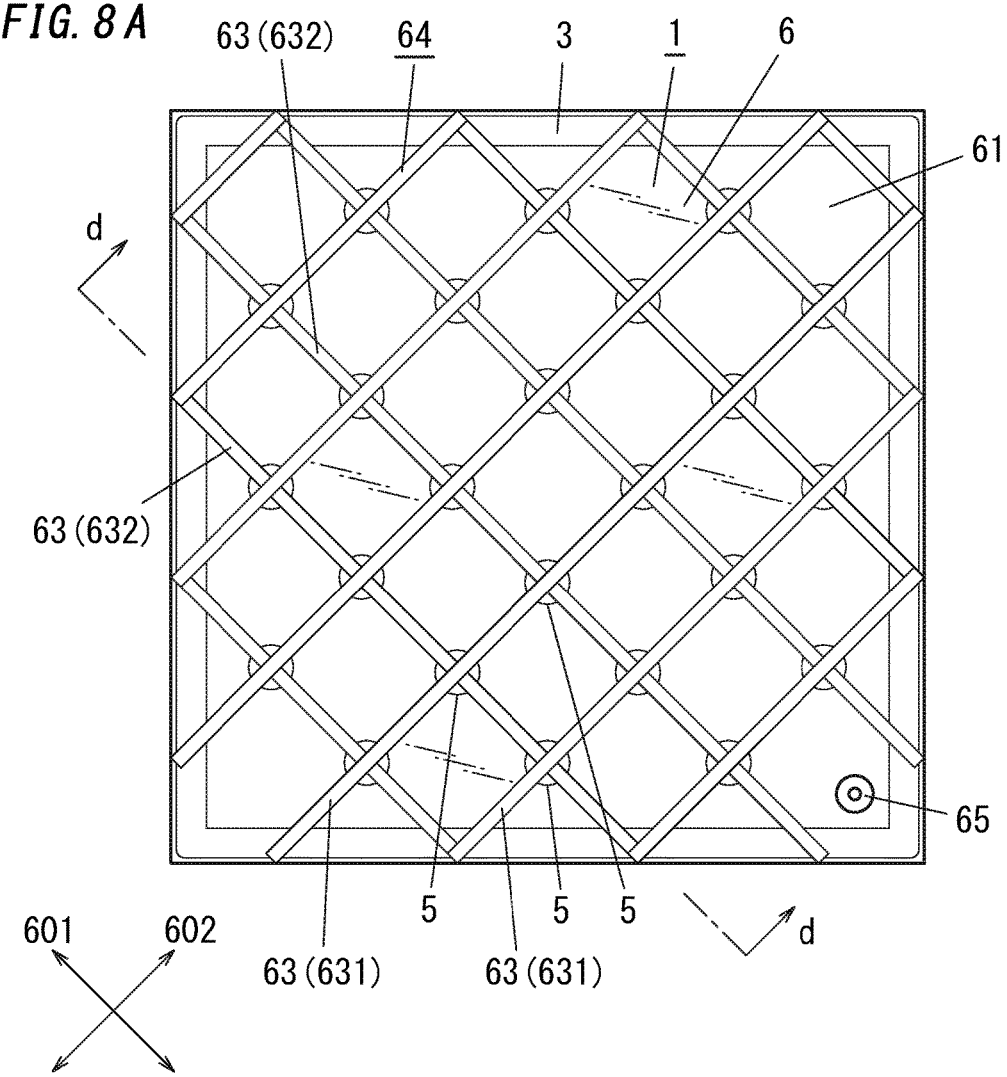
FIG. 8A is a schematic plan of a glass panel unit of Embodiment 4 and FIG. 8B is a section along line "d-d" in FIG. 8A.
Figure 8B:
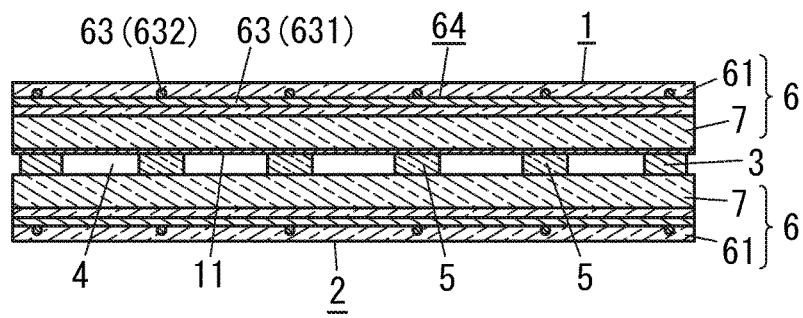

As shown in FIG. 8B, in the glass panel unit of Embodiment 4, an inside space 4 is formed between a pair of glass panels 7 facing each other. One glass panel 7 of the pair of glass panels 7 and a glass panel 61 mounted thereon constitute the first glass substrate 1, and the other glass panel 7 of the pair of glass panels 7 and a glass panel 61 mounted thereon constitute the second glass substrate 2.

As to each of the first glass substrate 1 and the second glass substrate 2, the glass panel 61 incorporating the wire structure 64 is on a further side from the inside space 4, and the glass panel 7 not incorporating a wire structure is on a closer side to the inside space 4.

A plurality of spacers 5 are positioned in the inside space 4 to overlap with intersections of the wire structure 64 embedded in the glass panel 61 of the first glass substrate 1 and additionally overlap with intersections of the wire structure 64 embedded in the glass panel 61 of the second glass substrate 2 in a plan view.

Accordingly, also in the glass panel unit of Embodiment 4, each spacer 5 can be visually perceived in a state where it overlaps with a corresponding intersection of the wire structures 64. Additionally, a total pattern of a combination of the plurality of spacers 5 and the wire structures 64 is repeated regularly, and thus appearance thereof may give a good impression to users.

Hereinafter, a manufacturing method of the glass panel unit of Embodiment 4 is described.

The manufacturing method of the glass panel unit of Embodiment 4 includes a placing step S1 (a spacer forming step S11 and a panel placing step S12), a bonding step S2, a pressure reducing step S3, and a mounting step S4 as with Embodiment 3.

Note that, in the mounting step S4 of Embodiment 4, the glass panel 61 with the wire structure 64 embedded therein is mounted on each of the pair of glass panels 7 opposite each other. As to each glass panel 61, positioning is done so that the plurality of spacers 5 overlap with the intersections of the wire structure 64 in a plan view. Thereby, the first glass substrate 1 and the second glass substrate 2 are formed.

By finishing the above individual steps, the glass panel unit of Embodiment 4 shown in FIG. 8A and FIG. 8B can be manufactured.

Embodiment 5

A glass panel unit of Embodiment 5 and a method for manufacturing the same are described with reference to FIG. 9A, FIG. 9B and FIG. 10. Note that, same components as Embodiment 1 are designated by common reference signs to avoid detailed descriptions, and different components from Embodiment 1 are described in detail.

Figure 10:
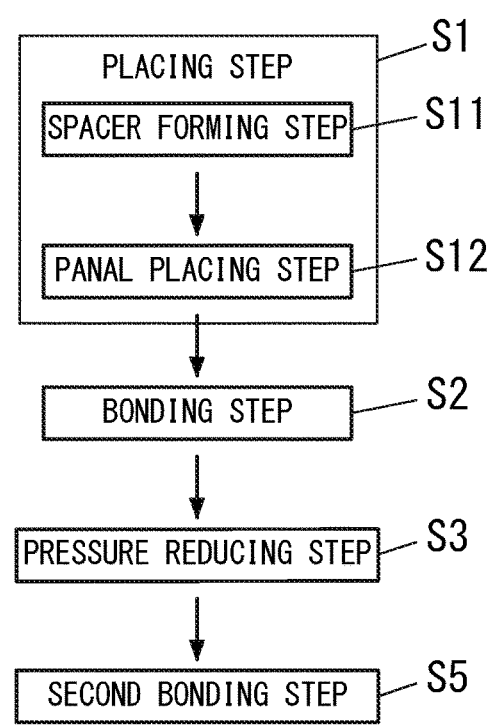
FIG. 10 is a flow chart for illustration of individual steps included in a manufacturing method for the glass panel unit of Embodiment 5.

A manufacturing method of the glass panel unit of Embodiment 5 includes, as shown in FIG. 10, a placing step S1, a bonding step S2, and a pressure reducing step S3, and additionally a second bonding step S5.

Figure 9A:
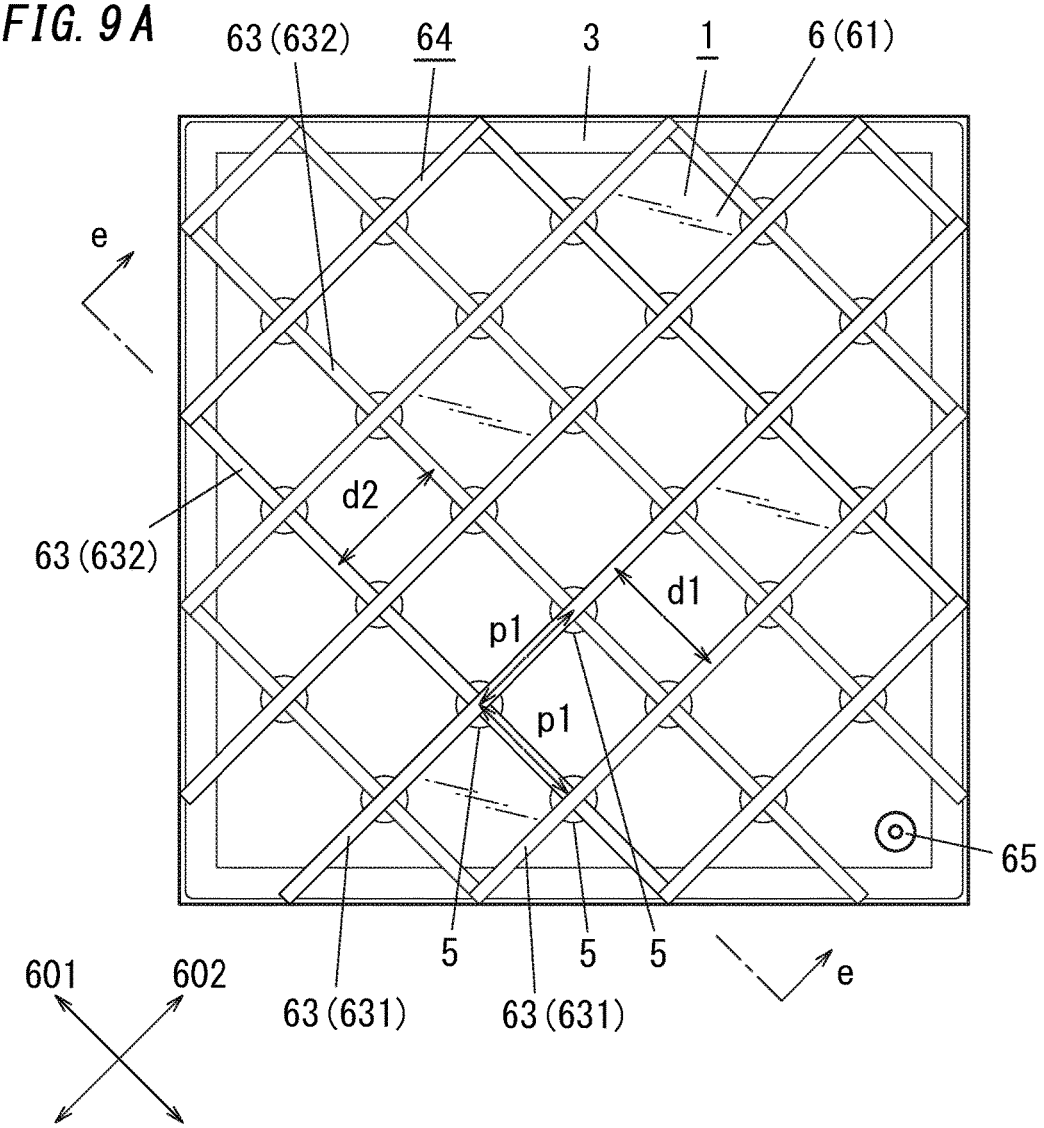
FIG. 9A is a schematic plan of a glass panel unit of Embodiment 5 and FIG. 9B is a section along line "e-e" in FIG. 9A.
Figure 9B:
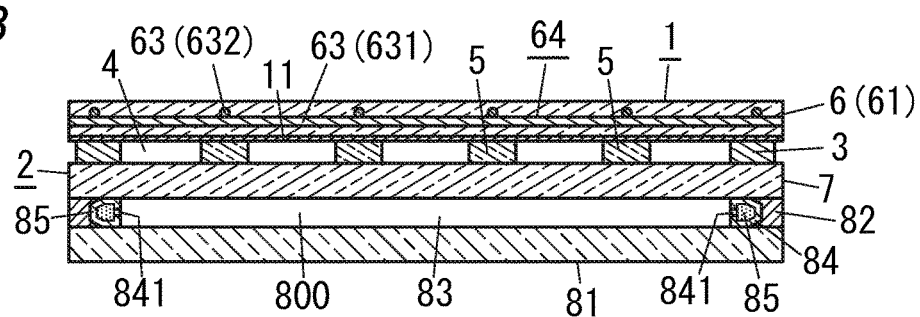

The second bonding step S5 is a step of bonding a second glass substrate 2 and a third glass substrate 81 to each other with a second sealing member 82 with a frame shape to form a second inside space 83 enclosed by the second sealing member 82 (see FIG. 9A and FIG. 9B).

There is a spacer 84 inside the second sealing member 82, and the spacer 84 has a frame shape with a hollow inside space. The hollow inside space of the spacer 84 is filled with desiccant 85.

The spacer 84 is made of metal such as aluminum and includes through holes 841 at its inner peripheral side. The hollow inside space of the spacer 84 is connected to the second inside space 83 through the through holes 841. Examples of the desiccant 85 may include silica gel. Examples of material for the second sealing member 82 may include highly airtight resin such as silicone resin and butyl rubber.

The second inside space 83 is a space hermetically separated from outside. The second inside space 83 is filled with dry gas 800. Examples of the dry gas 800 may include dry rare gas such as dry argon as well as dry air. Examples of the dry air may include air which is introduced in the second inside space 83 and then dried due to action of the desiccant 85.

According to the glass panel unit of Embodiment 5, the inside space 4 of which pressure is reduced until vacuum and the second inside space 83 filled with the dry gas 800 are interposed between the third glass substrate 81 and the first glass substrate 1 on opposite sides in the thickness direction. Thereby, thermally insulating properties can be more improved.

The glass panel unit of Embodiment 5 includes the second inside space 83 formed by mounting the third glass substrate 81 on the glass panel unit of Embodiment 1. The second inside space 83 may be formed by mounting the third glass substrate 81 on any of the glass panel units of Embodiments 2 to 4. In each case, the thermally insulating properties can be improved due to addition of the second inside space 83.

Applications

The following descriptions are made to glass windows including the glass panel units of Embodiments 1 to 5.

Figure 11:
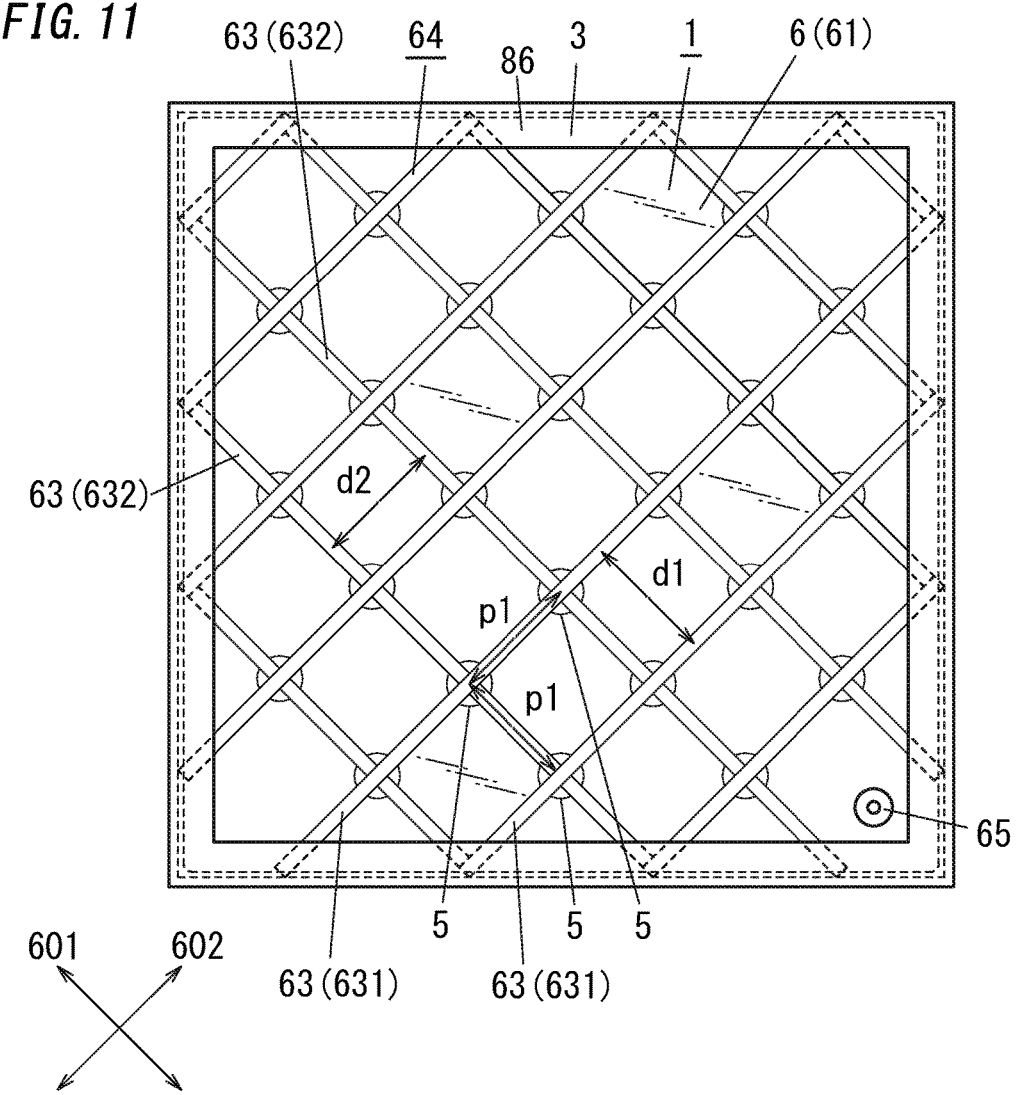
FIG. 11 is a schematic plan of a glass window including the glass panel unit of Embodiment 1.

FIG. 11 shows a glass window including the glass panel unit of Embodiment 1. This glass window has a structure where the glass panel unit of Embodiment 1 is fitted into a window frame 86, and thereby has improved thermally insulating and fireproof properties as well as improved appearance.

The glass panel unit of any one of Embodiments 2 to 5 also may be fitted into a same or similar window frame 86. Thereby, it is possible to form the glass window with improved thermally insulating and fireproof properties as well as improved appearance.

Hereinbefore, the embodiments are described. As for glass panel units, glass windows, and methods for manufacturing glass panel units, each embodiment may be modified appropriately according to design incentives, and one or more of components of the individual embodiments may be combined to apply to other embodiments.

As apparent from the aforementioned individual embodiments, a glass panel unit of the first aspect includes the following elements.

Namely, the glass panel unit of the first aspect includes a first glass substrate 1, a second glass substrate 2, a sealing member 3, an inside space 4, and a plurality of spacers 5.

The second glass substrate 2 is placed facing the first glass substrate 1. The sealing member 3 hermetically bonds outer peripheries of the first glass substrate 1 and the second glass substrate 2 to each other. The inside space 4 is hermetically enclosed by the first glass substrate 1, the second glass substrate 2, and the sealing member 3, and has reduced pressure. The plurality of spacers 5 are placed in the inside space 4.

At least one of the first glass substrate 1 and the second glass substrate 2 is a wire-embedded glass panel 6 with a wire structure 64 embedded therein. The plurality of spacers 5 are arranged so as to overlap with part of the wire structure 64 in a plan view.

The glass panel unit according to the first aspect including the above elements can have improved thermally insulating and fireproof properties. Additionally, the plurality of spacers 5 can be seen as overlapping with the wire structure 64, and this may suppress appearance thereof from feeling strange to users. Hence, the glass panel unit can have improved appearance.

The glass panel unit according to the second aspect includes the elements of the glass panel unit according to the first aspect and additional elements as follows.

Namely, in the glass panel unit according to the second aspect, the wire structure 64 includes a plurality of wires 63 crossing to form a mesh in a plan view. The plurality of spacers 5 are positioned to overlap with intersections of the plurality of wires 63 in a plan view.

The glass panel unit according to the second aspect includes the above elements. Therefore, a pattern of a combination of the plurality of spacers 5 and the wire structure 64 is repeated regularly, and this may lead to further improvement of appearance.

The glass panel unit according to the third aspect includes the elements of the glass panel unit according to the first or second aspect and additional elements as follows.

Namely, in the glass panel unit according to the third aspect, the wire-embedded glass panel 6 has a structure where a glass panel 61 with the wire structure 64 embedded therein and an additional glass panel 7 different therefrom are stacked. The additional glass panel 7 is on one of opposite sides of the wire-embedded glass panel 6 which is closer to the inside space 4 than the other is.

The glass panel unit according to the third aspect includes the above elements. Therefore, the inside space 4 is formed by use of the glass panel 7 and subsequently the glass panel 61 with the wire structure 64 embedded therein is mounted. This may lead to efficient manufacture.

The glass panel unit according to the fourth aspect includes the elements of the glass panel unit according to any one of the first to third aspects and additional elements as follows.

Namely, the glass panel unit according to the fourth aspect further includes: a third glass substrate 81 placed facing the second glass substrate 2; a second sealing member 82 hermetically bonding outer peripheries of the second glass substrate 2 and the third glass substrate 81 to each other; and a second inside space 83 hermetically enclosed by the second glass substrate 2, the third glass substrate 81, and the second sealing member 82 and filled with dry gas 800.

The glass panel unit according to the fourth aspect includes the above elements, and therefore can have more improved thermally insulating properties.

A glass window according to the first aspect includes the glass panel unit according to any one of the first to fourth aspects; and a window frame 86 into which an outer periphery of the glass panel unit is fitted.

The glass window according to the first aspect includes the above elements, and therefore the glass window can have improved thermally insulating and fireproof properties as well as improved appearance and additionally can suppress appearance thereof from feeling strange to users.

A method for manufacturing glass panel unit, according to the first aspect, includes the following elements.

Namely, the method for manufacturing glass panel unit, according to the first aspect, includes a placing step S1, a bonding step S2, and a pressure reducing step S3.

The placing step S1 is a step of placing a first glass substrate 1 and a second glass substrate 2 to face each other with a plurality of spacers 5 in-between. The bonding step S2 is a step of hermetically bonding outer peripheries of the first glass substrate 1 and the second glass substrate 2 to each other to form an inside space 4 between the first glass substrate 1 and the second glass substrate 2. The pressure reducing step S3 is a step of reducing pressure of the inside space 4.

At least one of the first glass substrate 1 and the second glass substrate 2 is a wire-embedded glass panel 6 with a wire structure 64 embedded therein. The placing step S1 includes arranging the plurality of spacers 5 so as to overlap with part of the wire structure 64 in a plan view.

The manufacturing method for glass panel unit, according to the first aspect, includes the above elements, and therefore enables production of the glass panel unit with improved thermally insulating and fireproof properties as well as improved appearance.

A method for manufacturing glass panel unit, according to the second aspect, includes the following elements.

Namely, the method for manufacturing glass panel unit, according to the second aspect, includes a placing step S1, a bonding step S2, a pressure reducing step S3, and a mounting step S4.

The placing step S1 is a step of placing a pair of glass panels 7 to face each other with a plurality of spacers 5 in-between. The bonding step S2 is a step of hermetically bonding outer peripheries of the pair of glass panels 7 to each other to form an inside space 4 between the pair of glass panels 7. The pressure reducing step S3 is a step of reducing pressure of the inside space 4. The mounting step S4 is a step of mounting a glass panel 61 with a wire structure 64 embedded therein on at least one of the pair of glass panels 7 so that the plurality of spacers 5 overlap with part of the wire structure 64 in a plan view.

The manufacturing method for glass panel unit, according to the second aspect, includes the above elements. Therefore, a glass panel unit with improved thermally insulating and fireproof properties as well as improved appearance can be efficiently manufactured by mounting the glass panel 61 with the wire structure 64 embedded therein.

A manufacturing method for glass panel unit, according to the third aspect, includes the elements of the manufacturing method for glass panel unit according to the first or second aspect and additional elements as follows.

Namely, in the method for manufacturing glass panel unit, according to the third aspect, the placing step S1 includes a spacer forming step S11. The spacer forming step S11 is a step of forming the plurality of spacers 5 by removing part 951 of a seat member 95 by punching with a punch 91 and placing the part 951 by the punch 91 according to a predetermined arrangement pattern.

The manufacturing method for glass panel unit, according to the third aspect, includes the above elements, and therefore enables efficient production of the glass panel unit with improved thermally insulating and fireproof properties as well as improved appearance.

REFERENCE SIGNS LIST

1 First Glass Substrate
2 Second Glass Substrate
3 Sealing Member

4 Inside Space
5 Spacer
6 Wire-embedded Glass Panel
61 Glass Panel
63 Wire
64 Wire Structure
7 Glass Panel
8 Seat Member
81 Part
91 Punch
S1 Placing Step
S11 Spacer Forming Step
S2 Bonding Step
S3 Pressure Reducing Step
S4 Mounting Step

The invention claimed is:

1. A glass panel unit comprising:
a first glass substrate;
a second glass substrate placed facing the first glass substrate;
a sealing member hermetically bonding outer peripheries of the first glass substrate and the second glass substrate to each other;
an inside space hermetically enclosed by the first glass substrate, the second glass substrate, and the sealing member and having reduced pressure; and
a plurality of spacers placed in the inside space,
wherein:
the first glass substrate includes a wire-embedded glass panel with a wire structure embedded therein, and an additional glass panel having no wire structure embedded therein stacked with the wire-embedded glass panel;
the second glass substrate has no wire structure embedded therein;
the additional glass panel having no wire structure embedded therein is stacked on a side of the wire-embedded glass panel which is closer to the inside space than another side of the wire-embedded glass panel;
the plurality of spacers are arranged so as to overlap with part of the wire structure in a plan view; and
a total pattern of a combination of the plurality of spacers and the wire structure is repeated regularly in all directions in the plan view.

2. The glass panel unit according to claim 1, wherein:
the wire structure including a plurality of wires crossing to form a mesh in the plan view;
the plurality of spacers are positioned to overlap with intersections of the plurality of wires in the plan view.

3. A glass window comprising:
the glass panel unit according to claim 1; and
a window frame into which an outer periphery of the glass panel unit is fitted.

4. A method for manufacturing glass panel unit, comprising:
a placing step of placing a pair of glass panels having no wire structure embedded therein to face each other with a plurality of spacers in-between;
a bonding step of hermetically bonding outer peripheries of the pair of glass panels to each other to form an inside space between the pair of glass panels;
a pressure reducing step of reducing pressure of the inside space; and
a mounting step of mounting a glass panel with a wire structure embedded therein on at least one of the pair of glass panels so that the plurality of spacers overlap with part of the wire structure in a plan view;
wherein:
the glass panel with the wire structure embedded therein is mounted on a side of the at least one of the pair of glass panels which is further from the inside space than another side of the at least one of the pair of glass panels;
the placing step includes a spacer forming step of forming the plurality of spacers by removing part of a seat member by punching with a punch and placing the part by the punch according to a predetermined arrangement pattern; and
the mounting step includes arranging a total pattern of a combination of the plurality of spacers and the wire structure is repeated regularly in all directions in the plan view.

5. A glass panel unit comprising:
a first glass substrate;
a second glass substrate placed facing the first glass substrate;
a sealing member hermetically bonding outer peripheries of the first glass substrate and the second glass substrate to each other;
an inside space hermetically enclosed by the first glass substrate, the second glass substrate, and the sealing member and having reduced pressure; and
a plurality of spacers placed in the inside space,
wherein:
the first glass substrate and the second glass substrate each include a corresponding wire-embedded glass panel with a wire structure embedded therein, and a corresponding additional glass panel having no wire structure embedded therein stacked with the wire-embedded glass panel;
the additional glass panel having no wire structure embedded therein in each of the first glass substrate and the second glass substrate is stacked on a side of the corresponding wire-embedded glass panel which is closer to the inside space than another side of the corresponding wire-embedded glass panel;
the plurality of spacers are arranged so as to overlap with part of the wire structure in a plan view; and
a total pattern of a combination of the plurality of spacers and the wire structure in each of the first glass substrate and the second glass substrate is repeated regularly in all directions in the plan view.

* * * * *